March 4, 1930.  H. E. WEBER  1,749,617
STABILIZER FOR VEHICLES
Filed Oct. 3, 1927
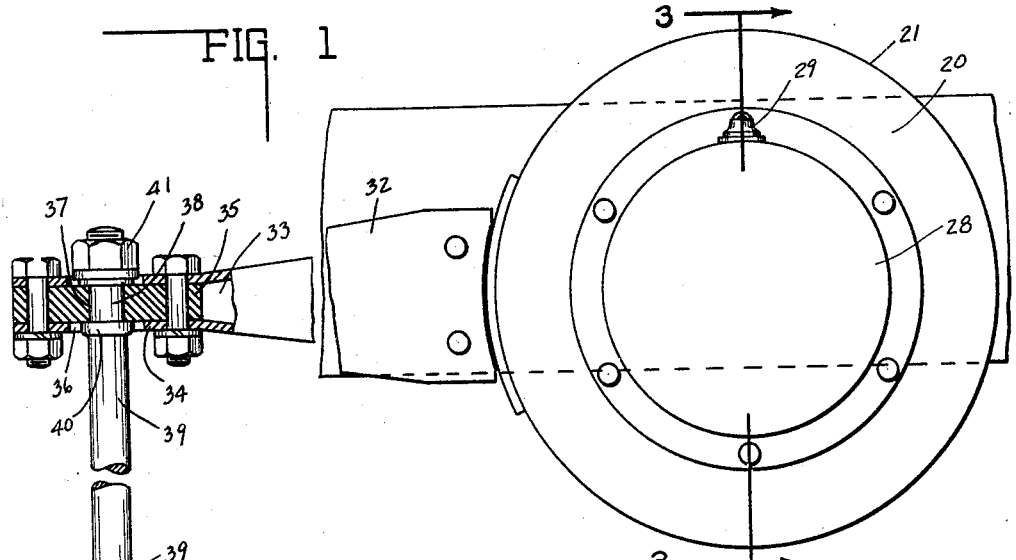
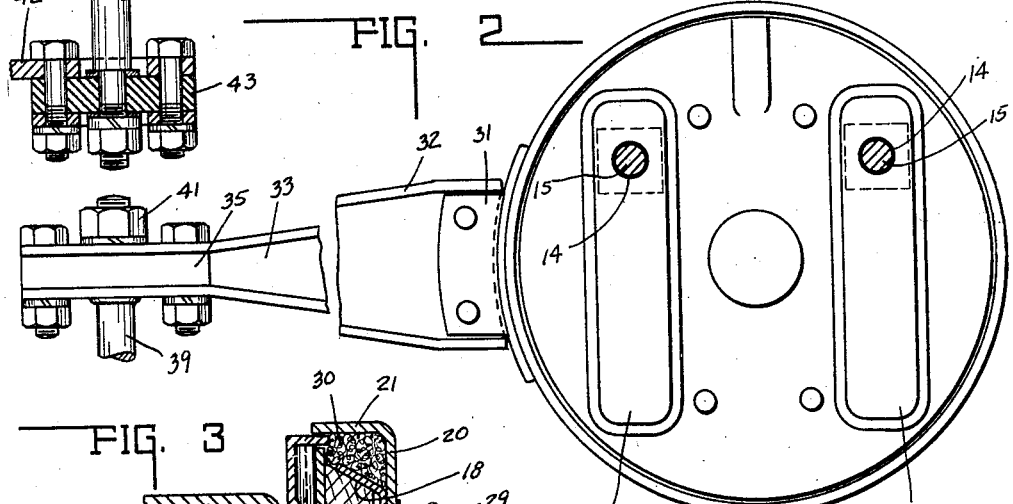
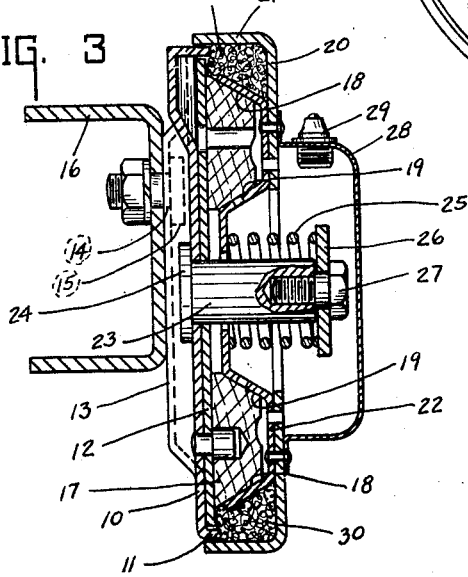
INVENTOR.
HENRY E. WEBER.
BY
ATTORNEYS.

Patented Mar. 4, 1930

1,749,617

UNITED STATES PATENT OFFICE

HENRY E. WEBER, OF INDIANAPOLIS, INDIANA, ASSIGNOR TO HASSLER MANUFACTURING CO., INC., OF INDIANAPOLIS, INDIANA, A CORPORATION

STABILIZER FOR VEHICLES

Application filed October 3, 1927. Serial No. 223,600.

This invention relates to a shock absorber or stabilizer for vehicle springs of that type adapted to frictionally control the movement of the springs in both the compression and rebound action or shimmying of the front wheels when connected with said wheels or the tie rod of the steering mechanism.

The object of the invention is to provide a stabilizer of this character which may be made of sheet metal stampings, eliminating all castings in the housing and mounting thereof, which will impart a smoother riding action due to the constant double conical frictional surfaces suitably lubricated so as not to resist vibration of the vehicle springs, and at the same time resisting their undue compression and rebound.

Another feature of the invention resides in the connections between the vehicle and the stabilizer such as to eliminate any metal contact therebetween, such connections being had thru a resilient and yielding material such as fabric or the like. This further cushions the action of the stabilizer against vibratory movements of the steering wheels or between the axles and body so as to impart a smoother effect upon pavements and the like. Furthermore, this means of connection facilitates the life and action of the stabilizer in eliminating any torsional strain which may be imparted thereto upon the side sway of the vehicle or for any other cause.

The full nature of the invention will be understood from the accompanying drawings and the following description and claims:

In the drawings Fig. 1 is a front elevational view of the stabilizer. Fig. 2 is a rear elevation thereof. Fig. 3 is a section taken on the lines 3—3 of Fig. 1.

In the drawings is shown a stabilizer comprising a sheet metal supporting plate 10 having an inwardly turned flange portion 11 which is secured rigidly to a reinforcing disc 12. The plate 10 is provided with a pair of recesses 13 oblong in shape provided with suitable holes 14 for receiving a square-headed bolt indicated by the numeral 15, the bolts mounted therein being adapted to extend thru and be locked on the vehicle frame 16. The recesses 13 are elongated so as to permit the placing of the holes for receiving the bolts at any point in their length and mounting the stabilizer on the frame at the proper height. Said recesses further act to prevent rotation of the square-headed bolts 15.

Rigidly secured to said plate 10, there is a friction element 17 having a conical exterior friction surface 18 and an inverted interior friction surface 19. Opposed to the plate 10, there is a cup-shaped cover 20 of sheet metal stamping having the annular flange 21 adapted to telescope about the flange 11 of the plate 10. Rigidly secured thereto there is a sheet metal friction element 22 formed with conical surfaces adapted to bear against and frictionally engage the friction surfaces 18 and 19 of the friction element 17.

Extending thru a central opening provided for the purpose in the plate 10 and the friction element 22, there is a hub-like stud 23 having a head 24 on the exterior of the plate 10 and protruding therethru to receive the spiral compression spring 25 having one end thereof bearing against the friction element 22 and the other end retained by the rotatable disc 26 secured to the outer end of said stud by the bolt 27. Said bolt is provided with a suitable shoulder so that the disc 26 will be rotatable between the head thereof and the end of the stud. This is for the purpose of preventing movement of the spring 25 during the action of the stabilizer from exerting a rotary action thru the disc 26 and thereby causing the stud 27 to become unscrewed. The stud and spring 25, as well as the other operating parts, are enclosed and housed by the closure 28 which is detachably secured to the outer surface of the cover 20.

The stabilizer is lubricated thru the medium of a lubricant fixture 29 leading into the interior of the housing formed by the plate, cover and closure 28. This permits the stabilizer to be well filled with lubricant, and under sufficient pressure to force the separation of the frictionally engaging surfaces against the tension of the spring 25 so as to reach and properly lubricate the surfaces thereof. A felt packing 30 is provided between the flange 21 and the friction element 22 in such a manner as to prevent the escape of lubricant or the entering of foreign matter between the telescoping flanges 11 and 12.

Rigidly secured to the periphery of the stabilizer, as above described, or rather to the exterior surface of the flange 21, there is a projection 31 adapted to be embraced by the laterally formed portion 32 of the arm 33 whereby said arm is rigidly connected with the movable part of the stabilizer when mounted,—i. e. the cover and flange 20 and 21. The opposite end of said arm has the flanges approaching each other to receive a fabric pad 35 which is compressed therebetween and further held in position by suitable bolts. A relatively large opening 36 is formed in the end of the arm thru said flanges 34, and a smaller opening 37 is formed in the fabric pad 35 to receive the reduced end 38 of the rod 39, which is provided with a shoulder 40. Said rod extending thru the opening in the pad is secured thereto by the nut 41 whereby it will be securely connected with the end of the arm, while having no metallic contact therewith. Also, the opening 36 in the arm is sufficiently large to permit ample play and movement of the rod with respect thereto without coming into contact with the metal. This provides not only a type of universal connection which relieves any torsional strain, but acts as a cushion which eliminates vibration between the parts.

The rod 39 has its lower end connected with the axle fitting 42 which likewise is provided with a fabric pad 43 spanning an enlarged opening to which the lower end of the rod 39 is connected so as to have no metallic contact with the axle fitting.

By means of the cushioned connection at both ends of the connecting rod 39, all torsional strain will be prevented from transmission to the stabilizer thru body sway or for any other reason and there will be sufficient movement permitted thru the two cushioned connections as to eliminate any vibration or other small movements of the axle from being transmitted to the stabilizer. This is highly desirable when the vehicle is passing over a pavement having relatively small irregularities therein.

As will be fully understood from the above, the compression of the vehicle springs will be resisted by the rotation in one direction caused by the action of the arm on the cover 20 thru the relative movement between the friction elements 17 and 22. A similar resistance will be set up upon the rebound of the spring. However, minor movements of the springs will not be materially resisted, so as to permit them to absorb vibration and prevent its being transmitted to the vehicle body, by reason of the cushion connections and the lubrication of the friction surfaces.

While ordinarily the resistance of frictional surfaces is diminished by lubrication, in this instance the double inverted conical surfaces are adapted to prevent the resistance between the friction elements from being substantially diminished by lubrication, while such lubrication permits a smoother action wherein there will be no gripping between the surfaces during their initial movement.

The invention claimed is:

1. A stabilizer comprising a pair of friction elements, a sheet metal cover secured to one of said elements, and a sheet metal supporting plate secured to the other element, said plate being provided with a recess formed therein for receiving the head of a securing bolt and preventing the rotation thereof.

2. A stabilizer comprising a pair of friction elements having oppositely disposed conical surfaces in frictional engagement, a sheet metal cup-shaped cover secured to one of said elements, a sheet metal supporting plate secured to the other friction element and surrounded by said cover, said sheet metal supporting plate being provided with a recess formed in the inner surface thereof for receiving the head of a securing bolt and preventing the rotation thereof.

3. A stabilizer comprising a pair of friction elements having oppositely disposed conical surfaces in frictional engagement, a sheet metal cup-shaped cover secured to one of said elements and having a flange surrounding the same, a sheet metal supporting plate secured to the other friction element and surrounded by said flange, a stud extending thru said sheet metal plate and friction elements into said cover, a disc rotatably mounted on the end of said stud, and a compression spring positioned between said disc and one of said friction elements for exerting a pressure between said element and the friction surface of the other element.

4. A stabilizer comprising a pair of friction elements having oppositely disposed conical surfaces in frictional engagement, a sheet metal cup-shaped cover secured to one of said elements and having a flange surrounding the same, a sheet metal supporting plate secured to the other friction element and surrounded by said flange, a stud extending thru said sheet metal plate and friction elements into said cover, a disc rotatably mounted on the end of said stud, and a compression spring positioned between said disc and one of said friction elements for exerting a pressure between said element and the friction surface of the other element, said plate being provided with a pair of rectangular recesses for receiving the head of a securing bolt and preventing the rotation thereof.

In witness whereof, I have hereunto affixed my signature.

HENRY E. WEBER.